Feb. 6, 1951 J. V. BROSAMER 2,540,507
STOCK WATERER
Filed Oct. 24, 1946 3 Sheets-Sheet 3

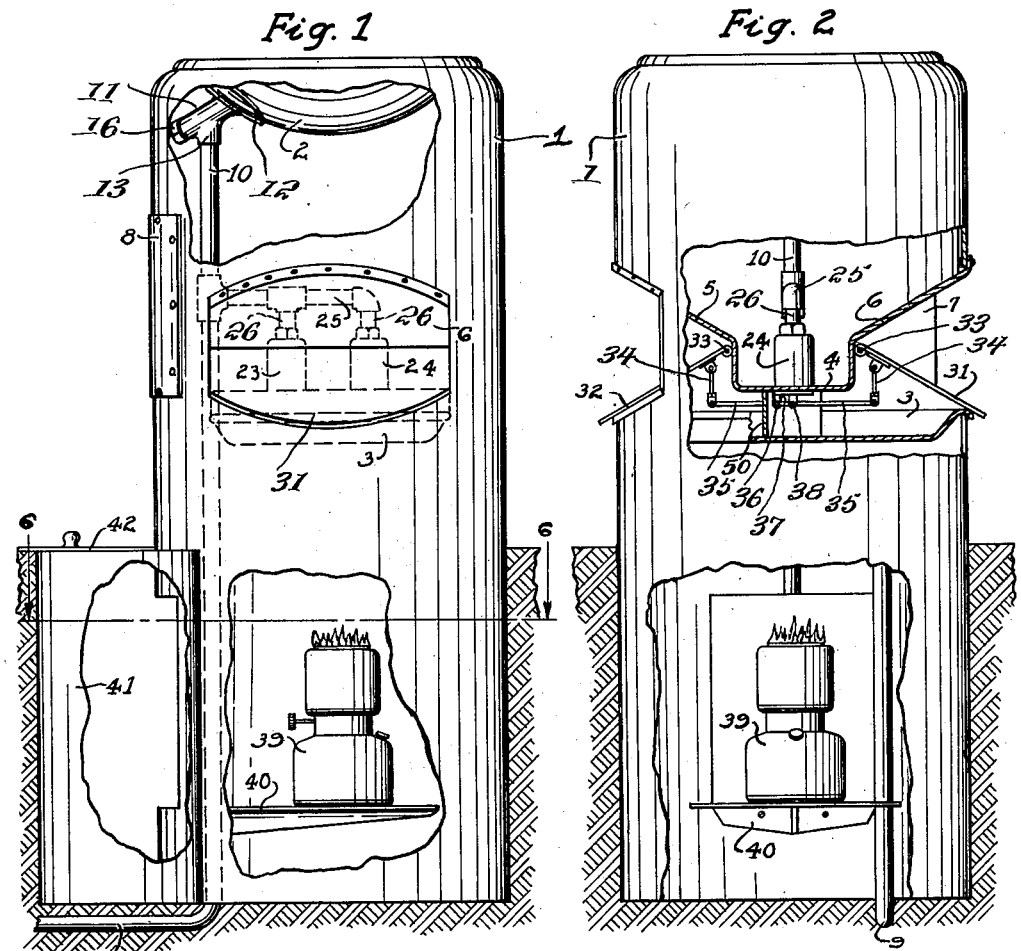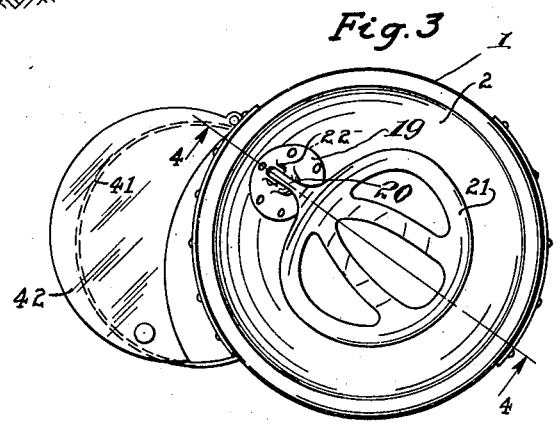

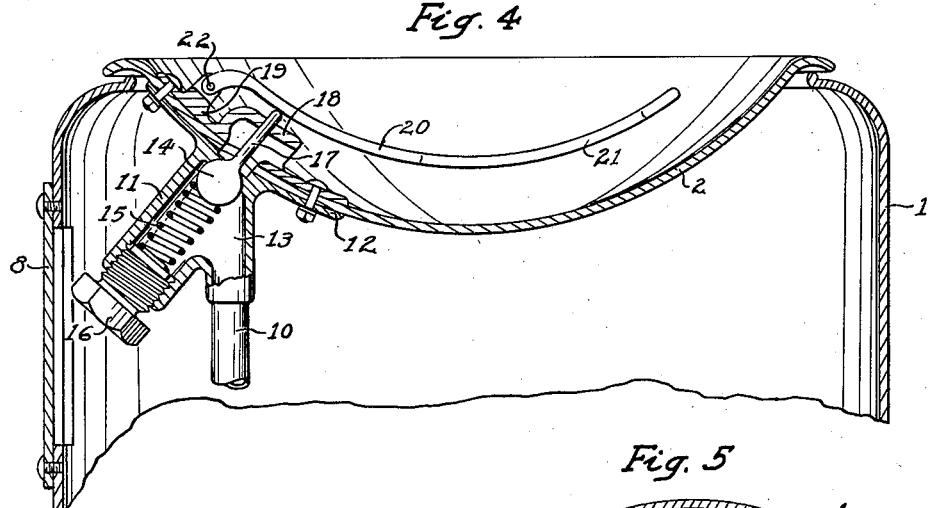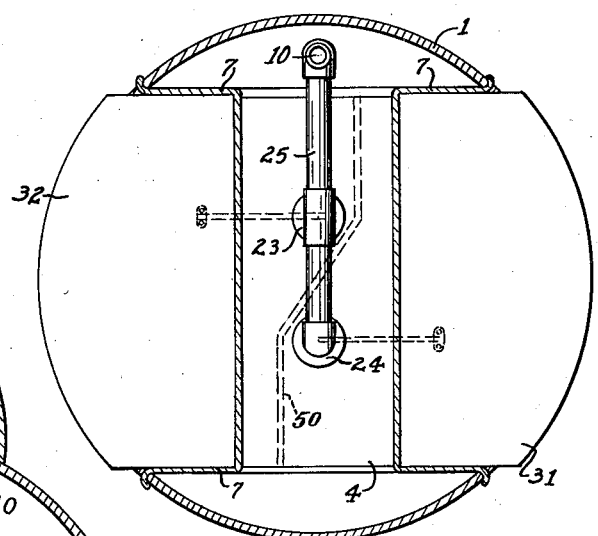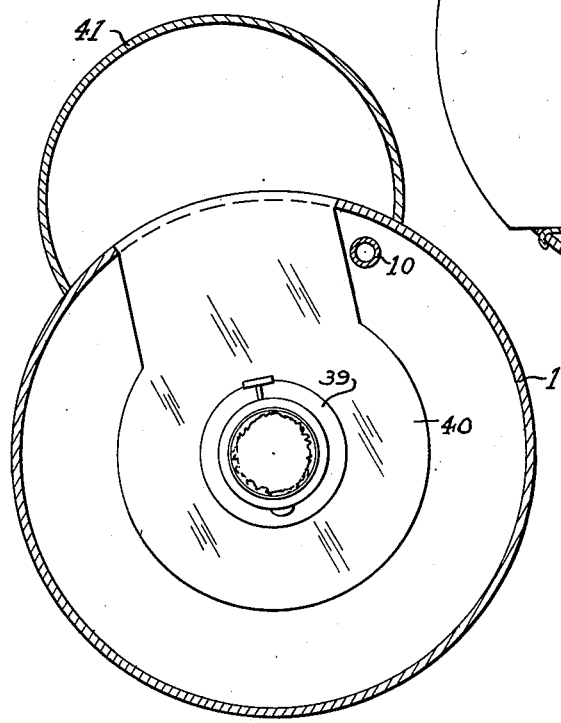

INVENTOR.
JACOB V. BROSAMER
BY Victor J. Evans & Co.
ATTORNEYS

Patented Feb. 6, 1951

2,540,507

UNITED STATES PATENT OFFICE 2,540,507

STOCK WATERER

Jacob Vincent Brosamer, Lincoln, Ill.

Application October 24, 1946, Serial No. 705,408

3 Claims. (Cl. 119—75)

My present invention relates generally to animal husbandry, and more specifically to an improved stock waterer of the type utilizing an animal controlled multiple fountain operating mechanism for supplying water to a drinking bowl and a drinking trough, which also includes temperature controlling means for the water supply.

The primary object of the invention is the provision of a watering appliance of the tank-enclosed type that is compactly arranged for watering, simultaneously, a number of animals both large and small, and which appliance is operated by the animals with efficiency and without waste of the drinking water. Valve-controlled fountains are employed, and actuated by the animals, to supply, only, the required quantity of water desired by the animal.

The watering appliance includes a minimum number of standardized parts that may be readily manufactured at low cost of production, and assembled and installed with facility, to provide a durable and reliable watering means for the animals that requires a minimum servicing for effective maintenance.

The invention consists essentially in certain novel combinations and arrangements of parts as will hereinafter be described, and more specifically set forth in the appended claims.

In the accompanying drawings I have illustrated one complete example of the physical embodiment of my invention wherein the parts are combined and arranged in accord with one mode I have devised for the practical application of the principles of my invention. It will be understood, however that changes and alterations are contemplated and may be made in these exemplifying drawings and mechanical structures within the scope of my claims without departing from the principles of the invention.

Figure 1 is a view in elevation of a watering appliance partially broken away for convenience of illustration, and illustrating one embodiment of my invention.

Figure 2 is another view in elevation as seen from the right in Fig. 1, also partly broken away to disclose interior parts.

Figure 3 is a top plan view of the appliance of Fig. 1.

Figure 4 is an enlarged detail vertical sectional view at the upper portion of the appliance, showing the open drinking bowl and its animal controlled fountain.

Figure 5 is a transverse sectional view showing the dual fountains and the animal controlled operating means therefor.

Figure 6 is a transverse sectional view at line 6—6 of Fig. 1 through the underground portion of the appliance and disclosing the heating apparatus.

Figure 7:
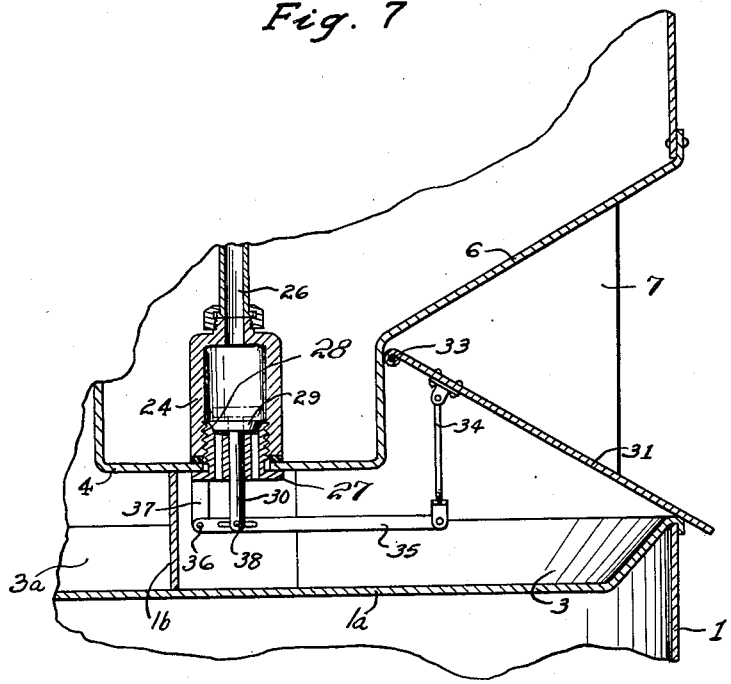
Figure 7 is an enlarged detail sectional view of one of the dual fountains and its operating means, together with the drinking trough supplied by these fountains.
Figure 8:
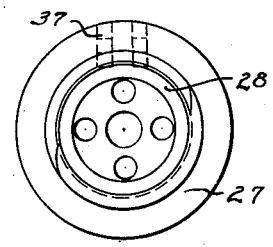
Figure 8 is an enlarged plan view of a screw plug or fixture including the valve seat of one of the dual fountains.
Figure 9:
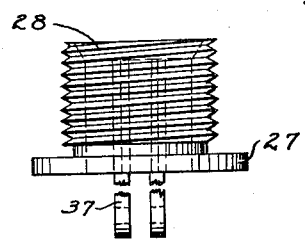
Figure 9 is an exterior view of this plug or fixture.

In the preferred form of the physical embodiment of my invention I utilize a cylindrical metallic casing or tank 1, the lower portion of which is installed in a suitable pit provided for the purpose, and conveniently located for ready access for tall animals to an upper, exterior, open concave drinking bowl 2 that forms the closed top of the tank. For shorter animals a horizontally disposed pan having an offset partition 50 therein providing drinking troughs 3 and 3a is rigidly mounted within the casing 1 at a convenient height above the ground level and the pan which is indicated by the numeral 1a is provided with a cross partition 1b, and openings are provided in the side walls of the casings for access of the animals to these troughs.

An interior, open end, channel shaped transversely extending partition 4 is rigidly mounted and centrally arranged over the pan, and two oppositely inclined lateral walls 5 and 6 diverge upwardly to the cylindrical wall of the tank or drum. These walls 5 and 6 are united by end walls 7 with the wall of the tank to provide a pair of diametrically opposite exterior recesses that extend inwardly over the troughs 3 and 3a, to afford space for and to accommodate the heads of the drinking animals.

Access to the interior of the tank, for servicing repairs and adjustments may be had through lateral openings or manholes that are normally closed by means of exterior cover-plates 8, 8, in Figs. 1 and 4.

For supplying water under pressure to the drinking bowl 2 and to the troughs 3 and 3a, an underground main pipe 9 is equipped with a supply pipe 10 that rises vertically through the tank, and at its upper end this pipe terminates in a fountain or valve device attached at the underside of the concavo-convex bowl 2 for admission of water to the bowl under control of an animal desiring a drink.

As best seen in Fig. 4 the fountain for feeding water to the bowl includes a cylindrical casing 11 having an attaching flange 12 secured to the underside of the bowl within the tank, and an inlet nipple 13 to which the pipe 10 is connected.

A spring closed ball valve 14 is mounted within the casing, and the spring 15 is interposed between the ball valve and a screw plug 16 threaded in the open lower end of the casing for adjusting the tension on the valve and closing the casing. The valve is provided with a radially extending stem 17 that projects through the valve seat and outlet port of the casing, and also through an angular nozzle 18 forming a part of a fixture 19 that is attached to the outer concave face of the bowl with the tip end of the stem protruding as shown.

For controlling the fountain and supplying the desired quantity of water to the bowl, an animal actuated depressible operating lever 20, having a head 21 in the form of an open-work spoon or concavo-convex plate which conforms to the contour of the bowl, is pivoted at 22 to the fixture 19.

Thus it will be obvious that the lever is normally held by gravity down upon the valve stem 17, that when the animal depresses the open-work spoonshaped lever head 21 the valve is opened and the fountain will supply water as long as the lever is depressed, and that when the animal withdraws its head from the bowl or from contact with the spoonshaped head the water supply is automatically cut off.

For the troughs provided for shorter animals that cannot reach the upper drinking bowl, two duplicate drinking fountains or valves 23 and 24 are provided directly above the troughs 3 and 3a, respectively, and these fountains are supplied from the pipe 10 through a horizontally extending branch pipe 25.

As best seen in Fig. 7 each fountain includes a cylindrical valve casing having an upper inlet pipe 26 depending from the branch pipe 25, and the open lower end of the casing is threaded upon a flanged, ported, and centrally bored screw plug or fixture 27 that is mounted and sealed in an opening in the bottom of the channel-shaped partition 4, to provide a seat 28 for a tapered disk valve 29, and also to provide a guide for the stem 30 of the valve.

The valve is closed downwardly by water pressure from above and by force of gravity, and the valve and its stem are lifted to admit water to the trough 3 by lever mechanism actuated by the animal desiring a drink. For this purpose each of the two fountains is equipped with an actuating member or cover plate as 31 and 32, each in the form of a flat plate of rectangular shape and provided with a rounded outer edge conforming to the contour of the cylindrical tank. The plates are pivoted at 33 to a wall of the partition 4 and each plate is located within a diametrically arranged recess of the tank in position to normally close down over a portion of the interior trough 3.

Each of these pivoted actuating plates, or liftable lids, is connected to a valve stem of a fountain by linkage that includes a link 34 pivoted at the underside of a cover plate, a horizontally extending lever 35 pivoted at 36 in a bracket 37 depending from the screw plug or fixture 27, and the lever is pivoted by a pin and slot connection at 38 to the valve stem 30.

In Fig. 7 it will be noted that the rounded lower edge of the liftable lid or plate 31 projects beyond the wall of the tank an ample distance to permit an animal, as a hog, to nose-up the lid and enter its head into the recess beneath the uplifted lid for access to the drinking water supplied to the trough 3 due to the opening of the fountain valve, as the cover plate or lid is lifted.

When the satisfied animal withdraws his head from under the lifted lid, and through the medium of the linkage, the valve is closed to cut off supply of water through the fountain.

To prevent freezing of the water supply within the tank and for controlling the temperature of the water, a suitable heating plant, as a kerosene heater or burner 39, is mounted within a heating compartment of the tank located beneath the trough 3 and within the underground portion of the tank. A fixed bracket 40 is provided for supporting the heater, and access may be had to the heater through an underground casing 41 that opens into the heating compartment, which casing is normally closed by a pivoted lid or cover 42.

By utilization of the dual, lower drinking fountains and trough, and the upper circular drinking bowl and fountain, it will be apparent that the tank may be located on the center line of a fence between two adjoining lots, fields, or enclosures, in order to give access to the drinking appliance at both sides of the dividing line for animals confined to separated lots, and of course the appliance may be located at any other desirable place for drinking purposes.

Having thus fully described my invention, what I claim as new and desire to secure by Letters Patent is:

1. In a stock watering fountain, the combination which comprises a vertically disposed casing having openings in the side walls thereof, a continuous horizontally disposed pan extended across the casing with the upper edge thereof corresponding with the lower edges of the openings in the walls of the casing, a vertically disposed partition dividing the pan into sections corresponding with the said openings, a transversely positioned horizontally disposed channel shaped partition extended across the casing and spaced above the pan, said channel shape partition having side flanges with upwardly extended sections connecting the edges thereof with the walls of the casing in the said openings in the walls and providing closures for the upper ends of the openings, cover plates positioned in the said openings hinged to the channel shaped partition and resting upon the side walls in the lower ends of the said openings, a water supply pipe having a valve therein positioned in the casing, and connecting means attaching the cover plate to the valve for actuating the valves of the water supply pipe by the cover plates as the cover plates are raised.

2. In a stock watering fountain, the combination which comprises a vertically disposed casing having an opening in the side walls thereof, a horizontally disposed pan positioned in the casing with the upper edge thereof corresponding with the lower edge of the opening, a transversely positioned horizontally disposed channel-shaped partition extended across the casing and spaced above the pan, said channel shape partition having side flanges with upwardly extended sections connecting the edges thereof with the walls of the casing in the said opening in the walls and providing closures for the upper ends of the openings, a cover plate positioned in the said opening hinged to the channel shaped partition, resting upon the edge of the wall and extended through the lower part of the opening, a water supply pipe positioned in the casing, a vertically disposed valve chamber mounted in the horizontally disposed partition and to which the water supply pipe is connected, a valve seat removably mounted in said valve casing, a valve positioned in the casing and having a stem extended through the said valve seat, and a plurality of levers connecting the said valve stem to the cover plate whereby the valve is opened as the cover plate is released.

3. In a stock watering fountain, the combination which comprises a vertically disposed casing having openings in the side walls thereof, a continuous horizontally disposed pan extended across the casing with the upper edge thereof corresponding with the lower edges of the openings in the walls of the casing, a vertically disposed partition dividing the pan into sections corresponding with the said openings, a transversely positioned horizontally disposed channel shaped partition extended across the casing and spaced above the pan, said channel shape partition having side flanges with upwardly extended sections connecting the edges thereof with the walls of the casing in the said openings in the walls and providing closures for the upper ends of the openings, cover plates positioned in the said openings hinged to the channel shaped partition and resting upon the edges of the walls in the lower ends of the said openings, a water supply pipe having a valve therein positioned in the casing, and means connecting the cover plate to the valve whereby the weight of the cover plate closes the valve and as the cover plate is raised the valve is opened.

JACOB VINCENT BROSAMER.

REFERENCES CITED

The following references are of record in the file of this patent:

UNITED STATES PATENTS

| Number | Name | Date |
|---|---|---|
| 669,415 | Jacobs | Mar. 5, 1901 |
| 733,966 | Howart | July 21, 1903 |
| 1,341,920 | McCartney | June 1, 1920 |
| 1,359,885 | Fullerton | Nov. 23, 1920 |
| 2,234,041 | Chandler | Mar. 4, 1941 |
| 2,297,379 | Wise | Aug. 29, 1942 |

FOREIGN PATENTS

| Number | Country | Date |
|---|---|---|
| 785,730 | France | Aug. 17, 1935 |